(12) United States Patent
Eiriksson et al.

(10) Patent No.: US 8,346,919 B1
(45) Date of Patent: Jan. 1, 2013

(54) FAILOVER AND MIGRATION FOR FULL-OFFLOAD NETWORK INTERFACE DEVICES

(75) Inventors: Asgeir Thor Eiriksson, Sunnyvale, CA (US); Wael Noureddine, Mountain View, CA (US); Balekudru A. Krishna, Sunnyvale, CA (US)

(73) Assignee: Chelsio Communications, Inc., Sunnyvale, CA (US)

( * ) Notice: Subject to any disclaimer, the term of this patent is extended or adjusted under 35 U.S.C. 154(b) by 250 days.

(21) Appl. No.: 12/749,769

(22) Filed: Mar. 30, 2010

(51) Int. Cl.
*G06F 15/16* (2006.01)
(52) U.S. Cl. ........ 709/224; 709/203; 709/221; 714/4.11
(58) Field of Classification Search .................. 709/203, 709/219–233; 714/1, 2, 4.11
See application file for complete search history.

(56) References Cited

U.S. PATENT DOCUMENTS

| | | | |
|---|---|---|---|
| 5,727,142 A | 3/1998 | Chen | |
| 5,802,258 A | 9/1998 | Chen | |
| 6,687,758 B2 | 2/2004 | Craft et al. | |
| 7,224,692 B2 | 5/2007 | Fan | |
| 7,620,726 B2 | 11/2009 | Craft et al. | |
| 7,640,364 B2 * | 12/2009 | Craft et al. | 709/250 |

* cited by examiner

*Primary Examiner* — David Lazaro
(74) *Attorney, Agent, or Firm* — Beyer Law Group LLP

(57) ABSTRACT

A method and apparatus are provided for communication of a host having a first network interface device and a second network interface device coupled thereto. The first network interface device is configured to operate a transport layer network connection between the host and a peer. The host is configured to, while the first network device is operating the transport layer network connection with the peer, independently determine connection information that describes the transport layer network connection being operated by the first network interface device. The second network interface device is caused to operate the transport layer network connection with the peer based at least in part on the connection information maintained by the host.

17 Claims, 9 Drawing Sheets

FAILOVER AND MIGRATION FOR FULL-OFFLOAD NETWORK INTERFACE DEVICES

BACKGROUND

The present invention is in the field of protocol offload devices such as intelligent network interface devices configured to offload protocol processing from host devices.

Intelligent network interface devices configured to offload protocol processing from host devices are known. Full offload protocol processing is mainly associated with connection oriented protocols, where a "connection" state is maintained at the communicating endpoints. For example, a "full offload" network interface device can handle connection setup, data transfer and connection tear down phases of a connection, all with no or minimal involvement by the host. Sometimes, for reasons such as reliability, it is necessary or desirable to "fail over" or otherwise move a connection from one network interface device to a different network interface device.

SUMMARY

In accordance with an aspect, a method and apparatus are provided for communication of a host having a first network interface device and a second network interface device coupled thereto. The first network interface device is configured to operate a transport layer network connection between the host and a peer. The host is configured to, while the first network device is operating the transport layer network connection with the peer, independently determine connection information that describes the transport layer network connection being operated by the first network interface device. The second network interface device is caused to operate the transport layer network connection with the peer based at least in part on the connection information maintained by the host.

DETAILED DESCRIPTION

Figure 1:
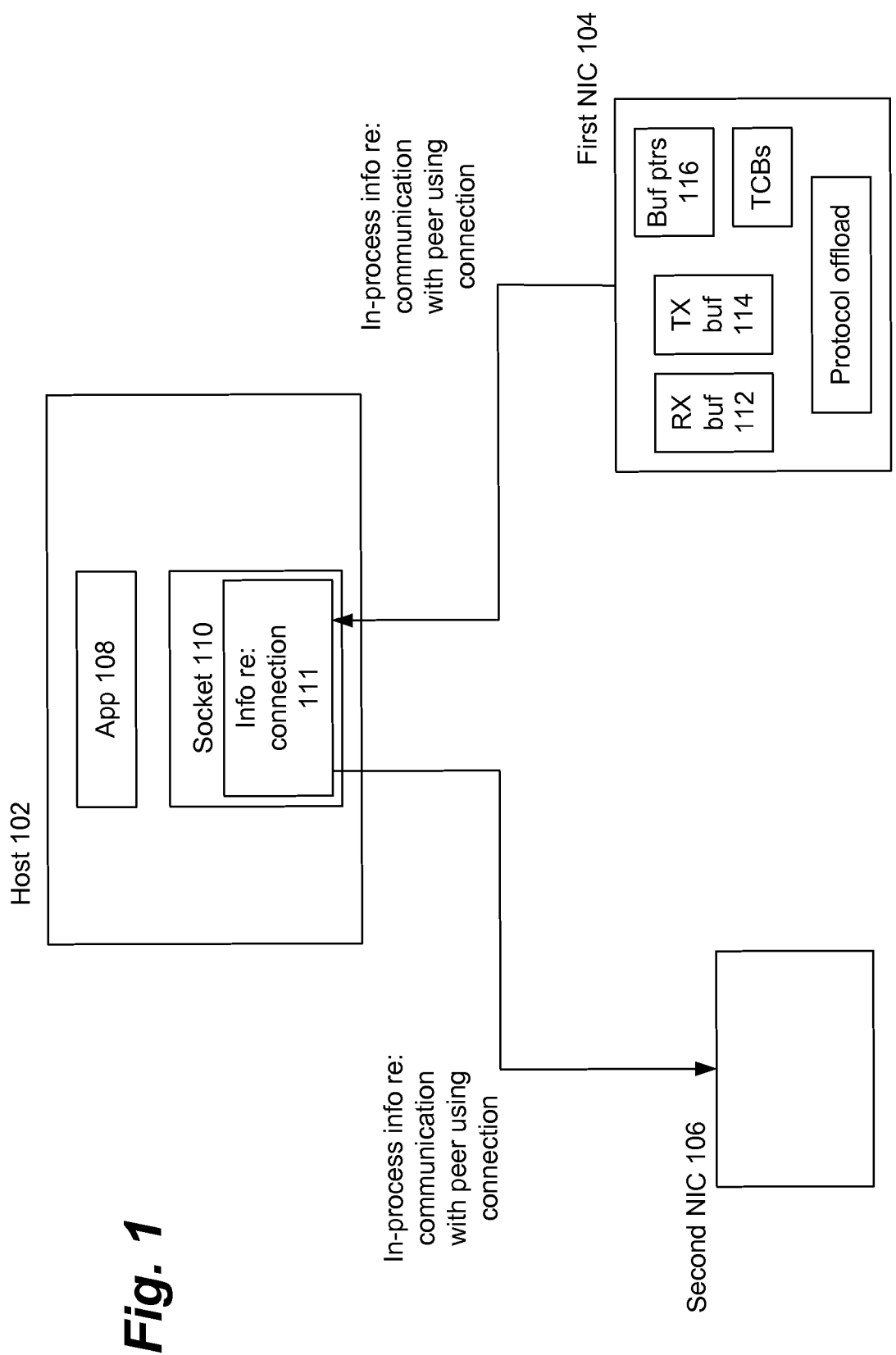
FIG. 1 is a block diagram illustrating a system including a host and two network interface controllers, in which a connection being operated by a first network interface controller may be then operated by a second network interface controller.

The inventors have realized that, particularly if the host protocol stack has not been involved in operating a particular protocol-based connection at all, it can be unwieldy to utilize the host protocol stack as an intermediate point in moving a connection from being operated by one network interface device to being handled by a different network interface device. For example, U.S. Pat. No. 6,687,758 (the '758 patent) describes a scenario in which a connection being operated by one network interface device is "flushed" to be operated by a host protocol stack and, then, a second network interface device is configured to operate that connection. In the case of the '758 patent, the network interface devices involved are not full offload devices—rather, the network interface devices operate only what is termed in the '758 patent as a "fast path" portion of a connection (which, at that, is only a portion of the data transfer phase of a connection).

In accordance with some aspects, even though a network interface device is operating a connection (e.g., handling the endpoint protocol processing with respect to that connection), the host system (typically, a network interface device driver or a portion of the host system closely associated with the network interface device driver) possesses most or all of the information that a different network interface device would need to operate that connection, even though the host would never operate the connection itself. The possession of such information may be, for example, in the driver's role as a supervisor of the network interface device and an interface between the network interface device and host applications. For example, for TCP/IP, the information may be a seq_no variable that denotes the sequence number in the TCP header and therefore corresponds more closely to a TCB state variable that is referred to usually as snd_una to signify a send sequence number that is unacknowledged). As another example, the information may be a rcv_nxt variable that signifies the next sequence number expected from the peer. As another example, the information may be a correspondence between an internal identification of a connection and an external identification such as a "tuple" (which may be used to uniquely signify a packet as belonging to a particular connection).

In moving the connection to be operated by another NIC, the endpoints of the connection stay the same (i.e. on the local side the connection remains connected to a particular application and the connection remains connected to the foreign/peer side). What occurs in moving the connection is that part of the local side endpoint "plumbing" moves from one network interface device to another network interface device.

In virtualization it is sometimes required to migrate a virtual machine from one host to another host. In such a case, the endpoints of the connection still stay the same. What occurs in moving the connection requires an extra step where the virtual machine is moved from one host to another host.

In one aspect, even though the network interface device is operating a connection (even in a full offload manner), the host is independently maintaining information such as an "initial sequence number" for a TCP/IP connection so that the host can adequately handle application payload data that is, as a result of protocol processing by the host, provided from the NIC to the host. For example, during the data transfer phase of a connection, even though the connection state variables (such as sequence numbers) are not provided from the NIC to the host, the host may derive the sequence numbers in order to determine where in host memory the application payload data has been placed by the NIC. This derivation allows the host to copy placed payload to application buffers, or in case the host memory location where application payload data was placed by the NIC corresponds to an application owned buffer, to indicate the locations where valid data have been placed.

For example, a low level device driver (LLD) operating in the host (e.g., as part of the operating system or in association with the operating system) looks at the current receive sequence number in an offloaded TCB, the current value of rcv_nxt, and programs this to be a starting sequence number (rx_buff_offset). The LLD furthermore sets up a mapping table such that TCP header sequence cur_seq_no is used to compute an offset into the table cur_seq_no-rx_buff_offset, and this offset maps to a particular bus address where the data may be placed, whether in order or out-of-order.

FIG. 1 illustrates a system including a host 102, a first NIC 104 and a second NIC 106. In FIG. 1, an application 108 on the host 102 utilizes a connection being operated by the first NIC 104, via a socket 110 executing on the host. For example, the host may be executing the application under the control of an operating system, including a driver program specially configured to interface the host 102 to one or more NIC' s. Much of the underlying functionality of the socket 110 is performed by a network interface device driver. As the first NIC 104 is operating a connection (such as setting up the connection, carrying out data transfer on the connection and tearing down the connection), the first NIC 104 provides information about the connection to the socket 110. The information is shown in FIG. 1 as information 111

For example, some of the information 111 about the connection may be provided from the first NIC 104 to the host 102 using a protocol language via which both payload data and commands are communicated among the host and the interface device, where the commands are relating to inter-operation of the local device and the interface device relative to the connections. See, for example, U.S. patent application Ser. No. 11/137,146 (Atty Docket No. CHELP008), filed on May 24, 2005, entitled METHOD FOR USING A PROTOCOL LANGUAGE TO AVOID SEPARATE CHANNELS FOR CONTROL MESSAGES INVOLVING ENCAPSULATED PAYLOAD DATA MESSAGES and incorporated herein by reference in its entirety. This is just one example of how the information about the connection may be provided from the first NIC 104 to the host 102 as the first NIC 104 is operating the connection. Other parts of the information 111 may originate from the host itself, as the host initiates, supervises and/or observes the operation of the connection.

Returning to the concept of connection oriented protocols, the endpoints maintain state related to the connection, including information to identify the packets belonging to the connection, typically referred to as a "tuple" of fields. For TCP/IP, the tuple identifying a connection would typically include at least the source and destination IP addresses, and the source and destination TCP port numbers, therefore referred to as a "4-tuple".

It is noted that, in one example, the first NIC 104 uses an internal connection identifier in connection processing, the internal connection identifier referred to as a "tid." For example, a content-addressable memory (CAM) may be employed, where the contents of the CAM are 4-tuples of TCP/IP connections being operated by the first NIC 104.

Other protocols, whether transport protocols or otherwise, may be uniquely identifiable by "tuples" as well, where the elements of the tuples generally identify the endpoints of the connection. As the first NIC 104 processes transport layer packets, the 4-tuple of each packet to be processed is presented to the CAM to determine an index for that connection, which is referred to as the "tid." This tid may then be used by the first NIC 104 to locate, in memory accessible to the first NIC 104, information usable by the first NIC 104 to perform transport layer protocol processing on the packet. When the connection is set up by the first NIC 104, the first NIC 104 reports the tid to 4-tuple correspondence for the connection.

As also shown in FIG. 1, the first NIC 104 maintains a receive payload buffer 112 for payload data, resulting from protocol processing by the first NIC 104, that has not yet been provided to the host. Also, the first NIC 104 maintains a transmit payload buffer 114 for payload data received from the host but which has not yet been protocol processed by the first NIC 104 for transmission to the peer, or payload data that has been sent by the first NIC but not yet acknowledged by the peer. The first NIC 104 maintains buffer pointers 116 that indicate, for example, what data in the buffers 112, 114 are available for consumption and what data is currently being consumed. Various buffer pointer schemes are possible.

Figure 2:
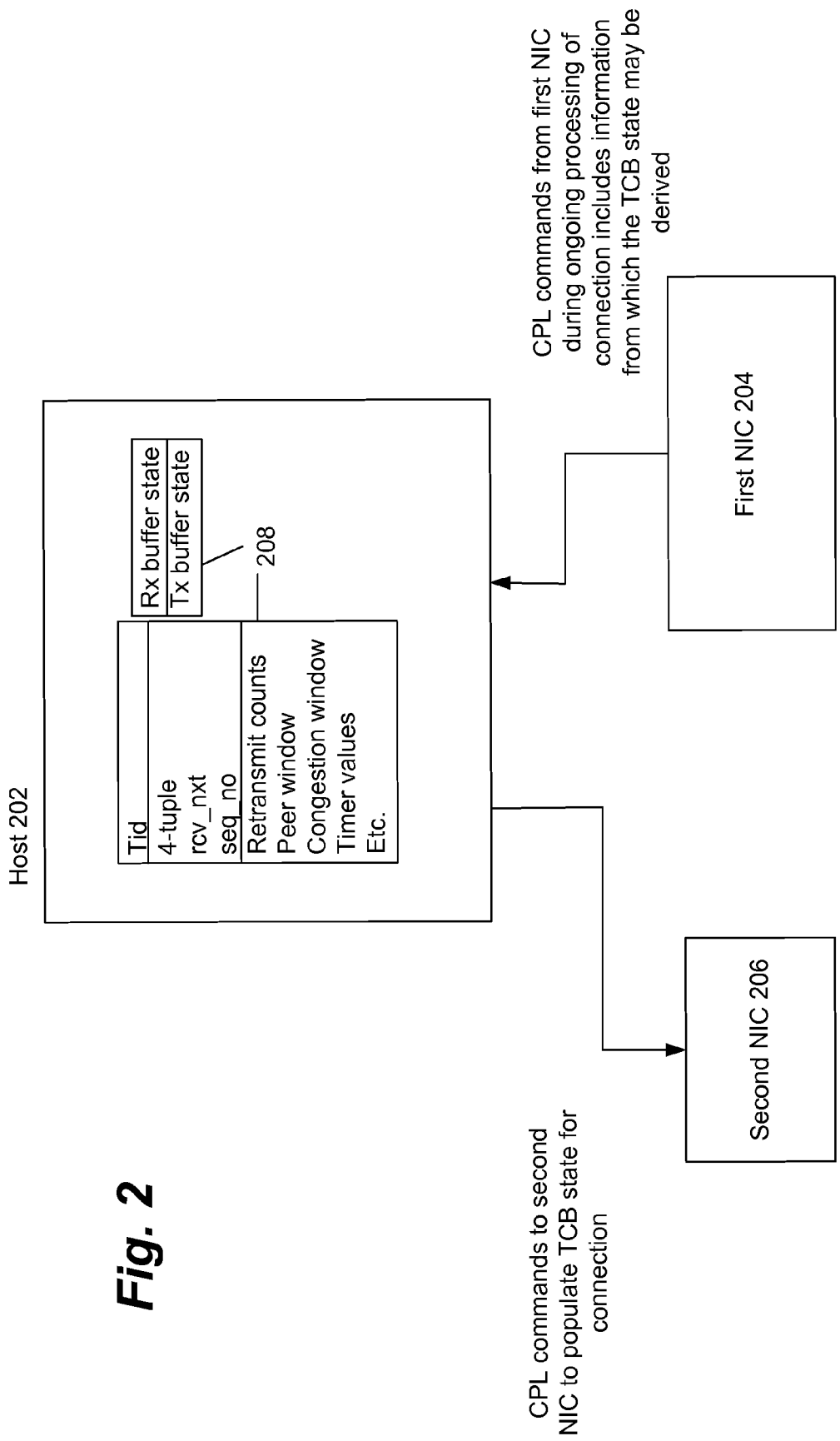
FIG. 2 illustrates in greater detail how information of the connection on the first network interface controller may be available to the second network interface controller, for the second network interface controller to operate the connection.

FIG. 2 is a block diagram that illustrates in greater detail how the host 202 may be aware of state information of a connection handled by the first NIC 204 as the first NIC 204 is operating the connection. More particularly, the CPL commands (CPL stands for "Chelsio Protocol Language") provided by the first NIC 204 to the host 202, typically in the normal course of the host 202 observing (or even supervising) how the first NIC 204 operates the connection, including information that the host 202 may directly provide or use to derive information to provide to the second NIC 206, for the second NIC 206 to operate the connection in place of the first NIC 204 operating the connection.

For example, Table 1 shows an example of what items may be included in the information 204, and an explanation of how that information was gleaned by the host 202. More information about each of the referenced CPL commands is provided below the Table.

| Information | Explanation |
|---|---|
| Tid to 4-tuple correspondence | Provided from the first NIC 204 when the connection is set up (CPL_ACT_OPEN_REQ command for the active connection setup (from host), and CPL_PASS_ACCEPT_REQ command in the passive open case (from peer). |
| Connection state | Determined based on connection establishment and teardown related CPL messages provided by the first NIC 204 to the host and messages sent to the first NIC 204 by the host (such as CPL_ACT_ESTABLISH, CPL_PASS_ESTABLISH, CPL_PEER_CLOSE, CPL_CLOSE_CON_REQ, CPL_CLOSE_CON_RPL). |
| TCP options | Determined during the connection establishment handshake based on information provided by the host to the first NIC 204 and by the first NIC 204 to the host. |
| irs | The initial receive sequence number is set using information returned in the connection setup messages |

-continued

| Information | Explanation |
| --- | --- |
| | CPL_ACT_ESTABLISH when the connection setup is initiated by the host 202 and the connection setup message CPL_PASS_ESTABLISH when the connection setup is initiated by the peer connecting to first NIC 204. |
| rcv_nxt | Set using irs and maintained by the host 202 during the data transfer phase. When first NIC 204 is reachable from the host at the time of migration/failover rcv_nxt is derived from information provided in the CPL teardown message sequence |
| iss | The initial send sequence number is determined based on information provided by the first NIC 204 in the connection setup CPL commands described above for rcv_nxt during the connection establishment. |
| snd_una | Set using iss and maintained by the host 202 during the data transfer phase When first NIC 204 is reachable from the host at the time of migration/failover snd_una is derived from information provided in the CPL teardown message sequence |
| tx_max | The sequence number of the last byte in the transmit buffer. The data might not have been sent yet to the peer, but only transferred from the host 202 to the first NIC 204, or it might have been sent and not yet acknowledged by the peer. |
| snd_max | The maximum sequence number that has been sent. In the failover migration process the value for snd_max can be approximated by using tx_max |
| snd_nxt | The next sequence number that is to be sent |
| Rx-buffer state | Provided by the first NIC 204 during the data transfer phase as part of commands associated with data transfer. |
| Tx-buffer state | Provided by the first NIC 204 during the data transfer phase as part of commands associated with data transfer. |

Furthermore, the inventors have realized that, for TCP/IP and for other types of communication protocols, there may be other information maintained about a connection by the first NIC 104 that is not strictly necessary to be provided to the second NIC 106 for the second NIC 106 to operate within the protocol. This information includes, for example for TCP/IP, retransmit counts, peer window, congestion window, timer values, etc. In some cases the second NIC 106 will reach the peer through a very different network path compared to the path used by first NIC, and it advantageous to revert to using default values for connection on the second NIC. This information that is not strictly necessary is optionally provided by the first NIC 104 to the host 102. Much or all of this information is information that may not be independently derived by the host 102 in the course of observing a connection being operated by the first NIC 104.

Additionally, the inventors realized that there may be information maintained by the first NIC 104 which can be derived by the second NIC 106 without necessitating the transfer of the information when a connection is failed over. For example, in the case of TCP/IP, the current snd_max value can be conservatively set to the maximum payload sequence number provided to the first NIC 104 by the host. Setting the snd_max value in this fashion results in a temporary discrepancy in the instantaneous value of this field, which would be subsequently corrected as the second NIC 106 progresses through the transmission. The side effects of such discrepancies may be acceptable in most environments.

We have generally described information that a host may possess regarding a connection being operated by a NIC. We now more particularly describe an example, with respect to TCP/IP, of how the information may come to be possessed by the host. Much of the information is related in one way or another to sequence numbers of the connection. Generally, every byte of payload data exchanged across a TCP connection, along with SYN and FIN flags, has an associated sequence number. The sequence number indicates an ordering of the data of the connection.

In operation, the TCP header of a received TCP segment includes a sequence number field, to indicate the TCP sequence number of the first byte of data contained in the TCP segment. As mentioned above, the TCP sequence number field can also indicate the sequence number of a SYN flag when that flag is set in the header or the TCP sequence number field can also indicate the sequence number of a FIN flag when that flag is set in the TCP header and there is no payload. When a segment with the FIN flag contains payload, the sequence number of the FIN flag is determined from the sequence number field and the length of the payload. The SYN and FIN flags are said to occupy space in the TCP sequence space, and these sequence numbers require special processing. For example, when processing received TCP data, special attention is paid to the SYN and FIN flags as they do not correspond to data, and they are not be processed as such. If this distinction is not made, this will lead to data corruption in the receive processing. The sequence number field that is extracted from a received TCP segment is used by TCP implementations to, among other things, manage a TCB state variable conventionally referred to as rcv_nxt. For example, see the well-known "TCP/IP Illustrated, Volume 2: The Implementation," by W. Richard Stevens, Gary R. Wright. Specifically, see the definition of tcpcb, at pp. 804. The rcv_nxt state variable indicates the sequence number expected in the following segment and is therefore useful (or perhaps even required) to continue the TCP connection operating on a different NIC.

Figure 3:
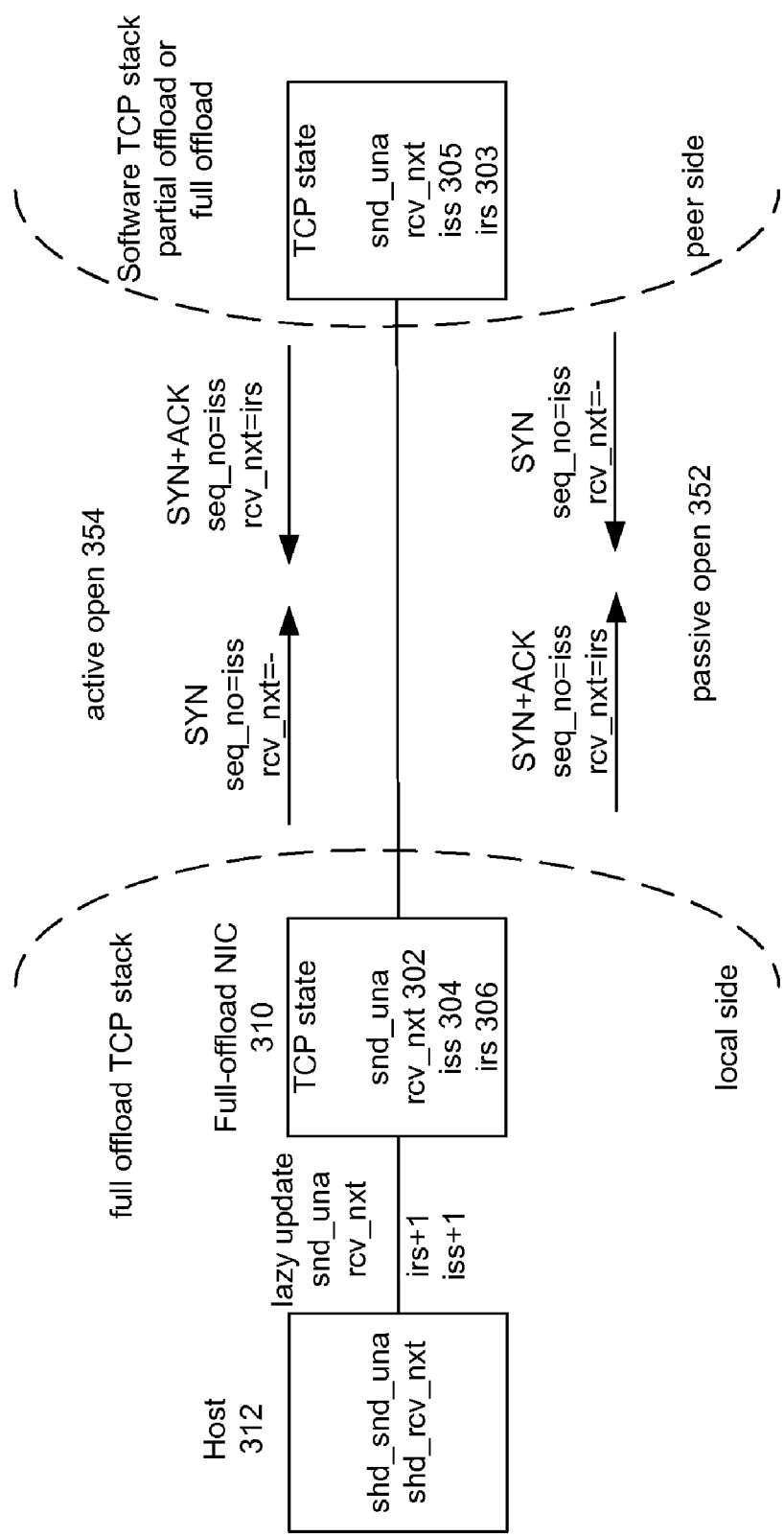
FIG. 3 is a block diagram illustrating how various TCP sequence number variables are maintained in a full-offload NIC.

FIG. 3 is a block diagram illustrating how various TCP sequence number variables are maintained in a full-offload NIC, i.e., one in which the NIC handles operating a connection with a peer, including opening of the connection with the peer. Referring to FIG. 3, a local side rcv_nxt TCB state variable 302 is set using a TCB state variable referred to as irs 303 (initial receive sequence number) sent, by the peer side to the local side, as part of a SYN TCP segment when the connection setup is initiated by the peer (passive open, designated by 352 in FIG. 3) or sent, by the peer side to the local side, in a SYN+ACK segment when the connection is initiated by the local side of a connection (active open, designated by 354 in FIG. 3). In both cases, the local irs TCB state variable 306 corresponds to the iss 305 (initial send sequence number) TCB state variable of the peer.

As mentioned above, in one example, communication between the local NIC 310 and the local host 312 may be via CPL messages or some other messaging delivery mechanism. The delivery process to the host for full-offload devices may include—for TCP data segments, for connection setup TCP segments, and connection teardown TCP segments—an encapsulated message header, referred to as a CPL header, and an indication of payload length for payload carrying CPL messages. There may not be, in general, a one-to-one correspondence between the TCP segments and the CPL payload carrying messages. For example, it is possible for the NIC 310 to receive the same TCP segment multiple times, to receive TCP segments out-of-order, to receive TCP segments where some of the bytes are retransmitted and some of the bytes have not previously been transmitted, etc. Furthermore, it is possible that the NIC 310 may coalesce payload from multiple segments into a single CPL_RX_DATA message, with the goal of reducing the processing rate and associated cost on the host. In one example, the local NIC 310 is a full offload device that is responsible for processing these cases and re-deriving an ordered byte stream without, for example, resorting to providing the received TCP segments to a "slow path" processing mechanism on the host 312.

The CPL connection setup messages may also include a tid index, which is an index used internally to the NIC 310 to identify the connection and to catalog information about the connection. The CPL connection setup messages may also include iss (or iss+1) and irs (or irs+1). The payload carrying CPL messages include the tid and an indication, explicit or implicit, of the number of bytes being delivered. When the offloaded connection contains higher level embedded headers within the TCP segments (such as iSCSI or iWARP RDMA headers), additional CPL messages, referred to as header messages, may be either processed on the host 31 or on the NIC 310 (such as by a control processor of the NIC 310).

Another sequence number variable used by TCP implementations is a rcv_nxt variable, which indicates the next sequence number expected to be received. In an example initialization step, a shadow rcv_nxt variable possessed by the host 312 is initialized to irs+1, using a data item in the CPL connection setup messages that is based on a TCB state variable iss (or irs+1) maintained by the NIC 310. Thereafter, the host updates the shadow rcv_nxt variable based on the length of the payload carrying CPL messages. Further, the shadow rcv_nxt variable is also updated based on the length of the headers that have been extracted from the TCP payload and higher-level CRC that has been extracted; these lengths are available from CPL messages provided from the NIC 310 to the host 312.

More particularly, for offloaded TCP connections, the TCP length may be equal to the total number of bytes reported in the CPL_RX_DATA message or, when TCP DDP is being used, that is reported in the CPL_RX_DATA_DDP and CPL_RX_DDP_COMPLETE messages. For iSCSI connections the updating process may add the length of the iSCSI headers received and header and data iSCSI CRC if any. The CPL_ISCSI_HDR message carries the headers. For iWARP RDMA connections, the process may add the length of the iWARP headers, the MPA markers if any, and the iWARP CRC. The total iWARP RDMA header length may be derived from the number segments received, plus the number of inbound reads and 0 B writes that are received.

As will be discussed in greater detail below, in one example, the shadow version of various sequence number variables are updated by the host 312 in a "lazy" manner since information from which the host may update the shadow version of the various sequence number variables may be provided to the host from the NIC only when particular conditions are met at the NIC 310. When the actual sequence number variables are needed, particular conditions may be "forced" such that sufficient information is then provided to the host from the NIC 310 so that the host 312 may update the shadow version for the sequence number variables to match the actual sequence number variables on the NIC, assuming the NIC 310 is in a condition to provide such information.

Having generally described how, with respect to TCP/IP, the host 312 may update state variables possessed by it, we now describe some specific examples of such updating. We first discuss how the host 312 may update sequence number variables used for transmit processing, such as a shadow snd_una variable (referred to also as shd_snd_una). Referring again to the Stevens TCP/IP illustrated books, we note that the snd_una TCP state variable is used by the protocol processing mechanism to keep track of the lowest sequence number of data sent over a TCP connection that has not yet been acknowledged by the peer. A typical TCP connection is configured such that every other segment that is received in order by a peer is acknowledged back to the sender. This configuration, referred to as delayed ACK, i.e. the acknowledgment is delayed until two segments are received or until a timer expires, is used to decrease the frequency of ACK packets back to the sender. Some popular TCP implementations delay the acknowledgment more than described here. That is, by not ACK-ing every packet, processing requirements in the sender may be decreased. A generalization may be, then, that the performance of a TCP processing stack, a host stack or offload stack, is determined in part by the rate of packets that need to be processed, i.e. by the number of packets that need to be processed per time unit. It may then be helpful to optimize the number of ACK to be processed by a TCP processing stack. In a full offload network interface device, this may entail updating snd_una that is sent back to a control processor of the NIC and back to the host device driver at a much lower rate than the number of ACKs received from the peer. This may lead to a significant performance improvement in the overall offload process, by significantly decreasing the number of events that need to be processed by the control processor.

Figure 4:
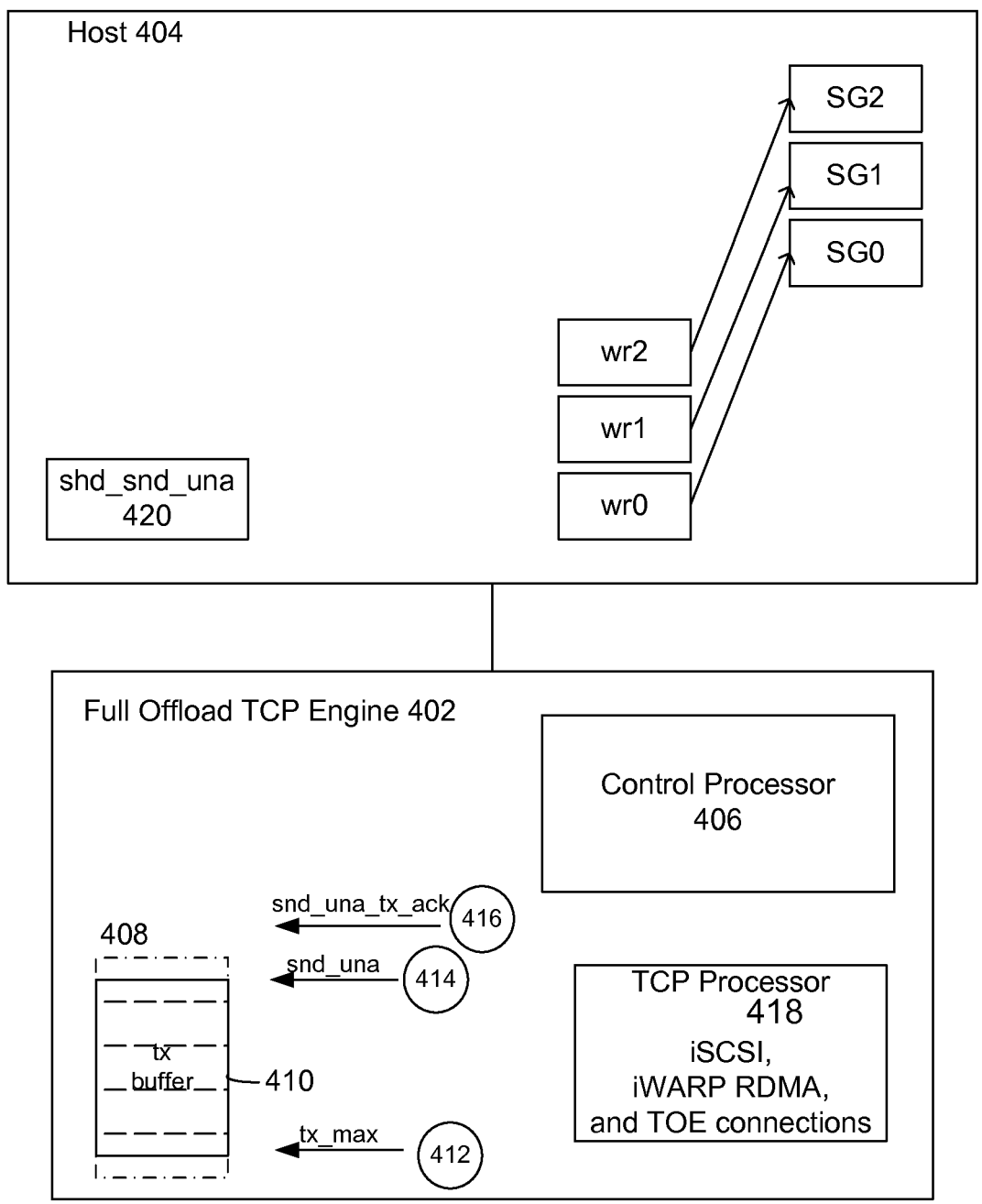
FIG. 4 is a block diagram illustrating an example of a transmit processing path for a full offload TCP processing stack.

Before discussing the receive sequence variables with respect to FIG. 3, we refer to FIG. 4, which is a block diagram illustrating an example of a transmit processing path for a full offload TCP processing stack: In FIG. 4, the transmit data is transferred to the Full Offload TCP Engine 402 from the host computer 404 via DMA work requests WR0-WR2 that in turn point to gather lists SG0-SG2. The work requests are transferred to a NIC control processor 406 that causes DMA ACK messages to be sent back to the host computer 404, for example when data has been read by the full offload TCP processing engine 402, or when the transmit data has been acknowledged by the peer. In either case, the transmit data is maintained on the host at least until the DMA ACK is received. The control processor 406 then schedules the DMA reading of the work requests and the associated data and transfers the transmit data to offloaded transmit buffer 408. The amount of data transferred to the transmit buffer 408 is typically much larger than the standard maximum TCP segment size of 1500 B. A transmit buffer, such as the tx_buffer 410, is maintained per connection and includes one or more pages typically of size 16 KB or 64 KB that are allocated from, and freed to, a free-page-pool.

An indication of the last byte that has been written into the transmit buffer 408 is tracked by the NIC with a variable tx_max, which typically does not align with the end of a memory page. The minimum send sequence number that has been acknowledged by the peer (i.e., for which an ACK has been received from the peer) is indicated by the variable snd_una 414. Referring to FIG. 4, the TCP processor 418 only reports the minimum acknowledged send sequence number for a connection to the Control Processor 406, to update the snd_una variable 414 for that connection, when that acknowledged send sequence number crosses a configured thresholds, such as a page boundary, e.g. every 64K bytes, or at an interval that is a multiple of the page size, or when the transmit buffer for that connection becomes empty, and this variable is referred to as snd_una_tx_ack 416. The snd_una variable 414 typically advances by twice the maximum TCP segment size which is typically 1500 B for standard sized Ethernet frames or 9000 B for Jumbo sized Ethernet frames. This arrangement where every received acknowledge is not reported to the control processor 406 can therefore significantly increase the efficiency of the TCP offload process.

The snd_una_tx_ack variable 416 is in turn reported to the host 404 when the Control Processor 406 acknowledges receipt of DMA read data from the host 404. In general, the host 404 therefore has an independently-determined shadow copy of snd_una 404, referred to here as shd_snd_una 420 that corresponds to the last page boundary crossing for the particular connection in the transmit buffer.

When the full offload NIC 402 is determined to be hung, or it is generally desired to transfer processing of the connection to another NIC, there may still be data for a connection in a transmit buffer that needs to be transferred to the host and then used to operate the connection in a second NIC.

The recovery process for shd_snd_una 420 entails determining, if possible, the tx_max transmit buffer variable 412 from the NIC 402, and writing a loopback port number into the state of the connection. If tx_max 412 is equal to shd_snd_una 420, then the transmit buffer 410 is assumed to be empty and shd_snd_una 420 is assumed to be up to date. If n_tx_buf bytes of data are received in the host 404, then shd_snd_una 420 is set to tx_max-n_tx_buf. If the reading of tx_max 412 fails, then it is assumed that shd_snd_una is up to date.

More particularly, for the recovery process, a CPL_ACT_OPEN_REQ is issued to a new NIC with the 4-tuple originally reported to the host 404 in the passive open request from peer, or with the 4-tuple used by local side in the CPL_ACT_OPEN_REQ. A connection, with new_tid, is configured in the new NIC with snd_una=shd_snd_una and rcv_nxt=shd_rcv_nxt. Finally, the transmit buffer data is re-delivered using a CPL_TX_DATA(new_tid), and receive buffer data is re-delivered using CPL_TX_PKT to the new NIC and specifying a port number such that the buffer data will loop back to the connection on the new NIC. An example of this process is described in greater detail below.

Figure 5:
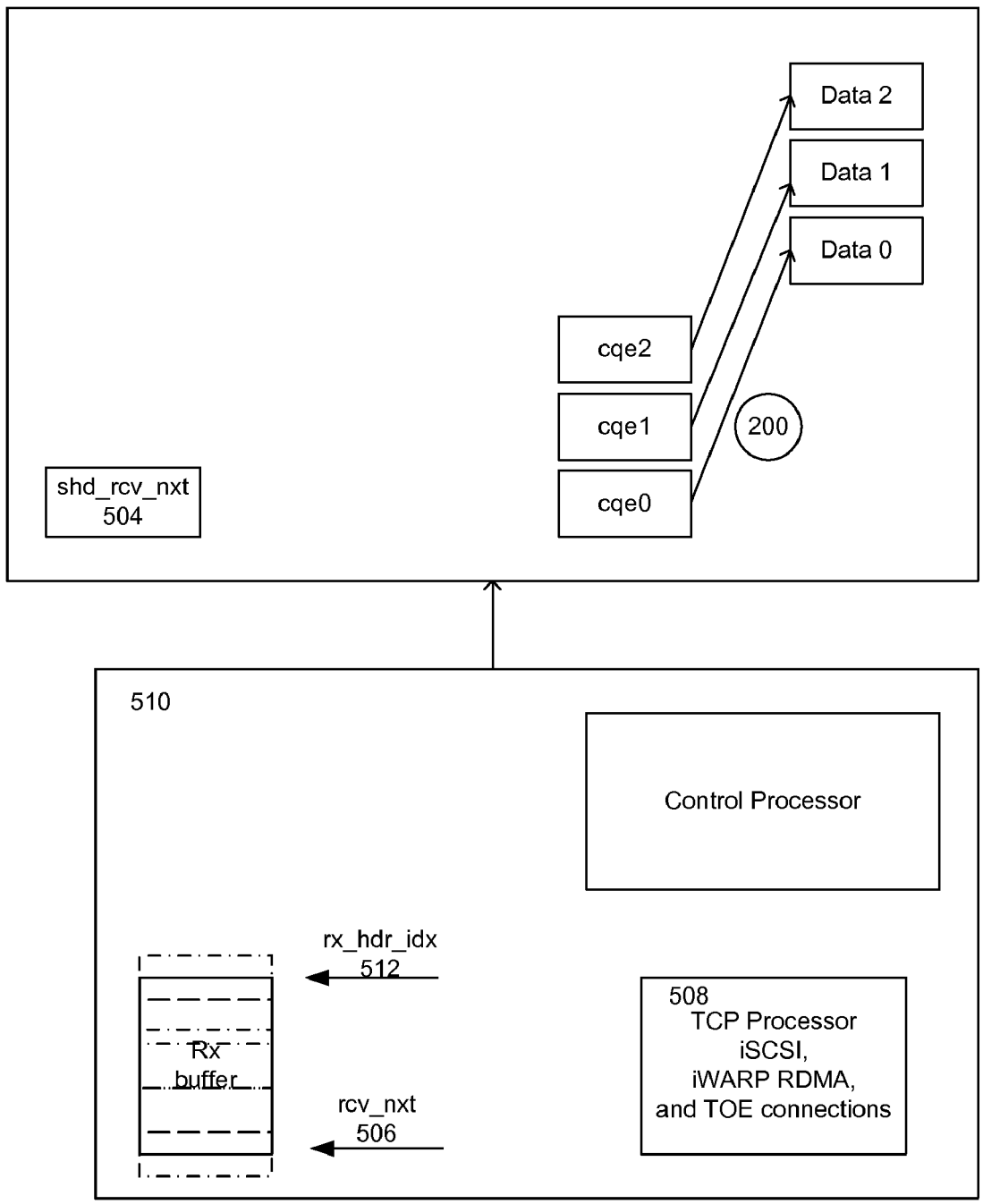
FIG. 5 is a block diagram illustrating an example of a receive processing path for a full offload TCP processing stack.

We now discuss with reference to FIG. 5 how the host 502 may update sequence number variables used for receive processing, such as a shadow rcv_nxt variable (referred to also as shd_rcv_nxt 504). Referring to FIG. 5, the rcv_nxt variable 506 is the state variable used in the TCP processing 508, i.e., this is the variable used by the TCP processing in the NIC 510 to validate segments received from the peer. The rx_hdr_idx variable 512, on the other hand, is a variable that is reported to the host upon occurrence of certain conditions. The conditions may include, for example, that a complete PDU (such as an iSCSI or iWARP PDU) has been received. Other examples are described in U.S. patent application Ser. No. 11/747,790, filed May 11, 2007 (Atty Dckt: CHELP018), which is hereby incorporated by reference in its entirety. Such other examples may include, for example, that an incoming packet is determined by the NIC to contain useful application level notifications, at the application layer and/or otherwise; an application buffer has reached a particular level; on the basis of elapsed time; etc.

In one extreme, the first NIC becomes unresponsive, e.g., it has hung, and in this case the transfer of operation of the connection from the first NIC to the second NIC can also proceed in speculative manner by initially assuming for each connection that the tx-buffer and rx-buffer are empty and that the seq_no and rcv_nxt stored on the host computer are up to date. If it turns out that the assumption is not correct, then the peer will receive segments that have a stale seq_no (i.e., a seq_no from the past), and the peer will acknowledge the latest sequence number it received in order. The second NIC will use the acknowledgment information to update its snd_una sequence number appropriately. If the rcv_nxt variable is not consistent, then the second NIC will receive segments with sequence numbers seemingly in the future, and it will not acknowledge these, and instead will expect sequence numbers that are in the past for the peer. This will eventually lead to a failure of the connection. On the other hand if the assumption turns out to be valid, i.e. the rcv_nxt is consistent with respect to the peer, then the connection can be successfully migrated to the second NIC.

Thus, for example, when the full offload NIC is determined to be "hung," the NIC may still have data for a connection in the receive buffers of the NIC. For offloaded connections in TOE mode, the receiver might be waiting for a threshold amount of data to accumulate or for a timer to expire. For iSCSI and iWARP RDMA connections the receiver logic might be waiting to receive the remainder of an iSCSI PDU, or iWARP RDMA PDU before forwarding the PDU to the host. For all these cases, in one example, the mode of the connection may be changed to TOE mode and the accumulation threshold set to zero bytes, which cause all the data to be forwarded to a pre-specified DMA receive queue on the host.

In one example, then, when the remnant receive data is received on the host, the shd_rcv_nxt variable 504 for a tid is incremented by the amount of data received on the host, and this value for shd_rcv_nxt 504 is the value that may be used to continue the connection, such as on a different NIC. When it is not possible to change the mode of the connection to TOE mode and to set the accumulation threshold to zero bytes, then the shd_rcv_nxt variable 504 may be assumed to be up to date and operation of the connection on the different NIC may be continued on the basis of this assumption.

If it was not possible to access the NIC so as to force a condition by which the host 502 can update the shd_snd_una 420 and shd_rcv_nxt 504, the connection, when operated on the failover NIC, will not make forward progress. However, it can be ensured that there will be no corruption of payload data of the connection. In one extreme the first NIC becomes unresponsive, it has hung, and in this case the failover can also proceed in speculative manner by initially assuming for each connection that the tx-buffer and rx-buffer are empty and that the seq_no and rcv_nxt stored on the host computer are up to date. If it turns out that the assumption is not correct then the peer will receive segments that have a stale seq_no, a seq_no from the past, and the peer will acknowledge the latest sequence number it received in order. The second NIC will use the acknowledgment information to update its snd_una sequence number appropriately. If the rcv_nxt is not consistent then second NIC will receive segments with sequence numbers in the future, and it will not acknowledge these, and instead expect sequence numbers that are in the past for the peer, which will eventually lead to a failure of the connection. On the other hand if the assumption turns out to be valid, i.e. the rcv_nxt is consistent with respect to the peer then the connection can be successfully migrated to second NIC.

Figure 6:
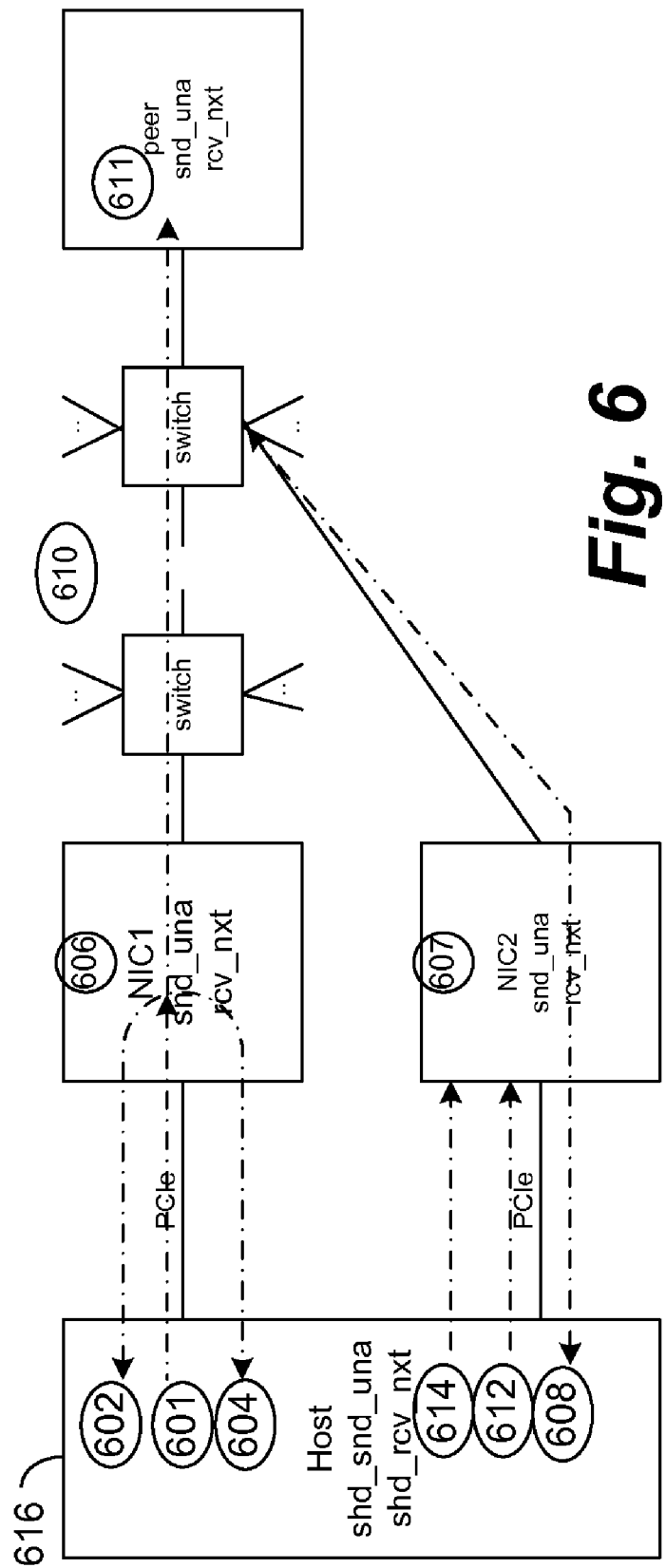
FIG. 6 is a block diagram illustrating how, in a process of switching from operating a connection on one NIC to operating the connection on another NIC, information regarding the connection may be retrieved from the first NIC.

For example, referring to FIG. 6, NIC1 606 may be inaccessible hung to the point that the state of NIC1 606 cannot be accessed. In this case, the failover process is reduced to using shd_snd_una 420 and shd_rcv_nxt 504 speculatively. That is, an attempt may be made to operate the connection on NIC2 607 using CPL_ACT_OPEN_REQ to set the NIC2.snd_una=shd_snd_una and NIC2.rcv_nxt=shd_rcv_nxt, even though one or both of these shadow variable values may be stale. However, so long as there is no possibility of data corruption in the case where the information is stale, this attempt offers the possibility of being able to fail over the connections where shd_snd_una and shd_rcv_nxt happen to be up to date when the NIC1 606 hangs or otherwise becomes inaccessible.

We now discuss the situation of one of the shadow variables being stale, and discuss how it can be ensured that there is no possibility of data corruption. We first consider the case where shd_snd_una 420 is stale. By setting NIC2.snd_max=NIC2.snd_nxt=NIC2.snd_una=Host.shd_snd_una, it is ensured that no data corruption will result in the stale variable case. Here snd_nxt is the next sequence number that would be used to transmit a TCP segment, and is incremented by the number of bytes sent when a data segment is sent but can also get decremented in cases where there is packet loss; snd_max is the maximum sequence number that has been sent for this connection.

When the peer 611 receives a segment with sequence number shd_snd_una that is stale, the peer 611 will reply with an acknowledge number that corresponds to peer.rcv_nxt, and this number will be larger than the sequence number sent by NIC2. When this replied TCP segment reaches NIC2 607, the TCP protocol processing in NIC2 607 will determine that the acknowledge number is acknowledging a future sequence number and the TCP protocol processing in NIC2 607 will drop any such segment. This is according to RFC: 793 TRANSMISSION CONTROL PROTOCOL DARPA INTERNET PROGRAM PROTOCOL SPECIFICATION September 1981. NIC2 607 will respond with an ACK TCP segment with the sequence number set to NIC2.snd_nxt and the acknowledge number set to NIC2.rcv_nxt. That is, NIC2 will not determine that the data that is being sent with a stale sequence number is being acknowledged, and the peer 611 will not accept such data because the sequence number is too low. While data may no longer be sent using the connection, there is also no possibility of data corruption.

We now consider the stale shd_rcv_nxt 504 case. In this situation, the peer 611 will eventually, after a timeout, retransmit data with sequence number peer.snd_una. To NIC2 607, this data segment is in the future. In a worst case, NIC2 607 will treat this data as being "out-of-order" and will buffer the data in a receive buffer. At the same time, however, NIC2 607 will respond with an ACK segment with the acknowledge number set to NIC2.rcv_nxt. When this ACK segment is received in the peer 611, the peer 611 will treat the segment as being in the past, and the peer 611 will therefore not conclude that any data being sent with sequence number peer.snd_una needs to be acknowledged. In this case, then, NIC2 607 is not accepting any data from the peer 611, and the peer 611 is not getting acknowledge numbers that would indicate that the peer.snd_una data is being acknowledged. While data may no longer be received using the connection, there is also no possibility of data corruption.

We now discuss, still with reference to FIG. 6, a scenario in which at least some aspects of the NIC1 606 are available to the host 616.

Figure 7:
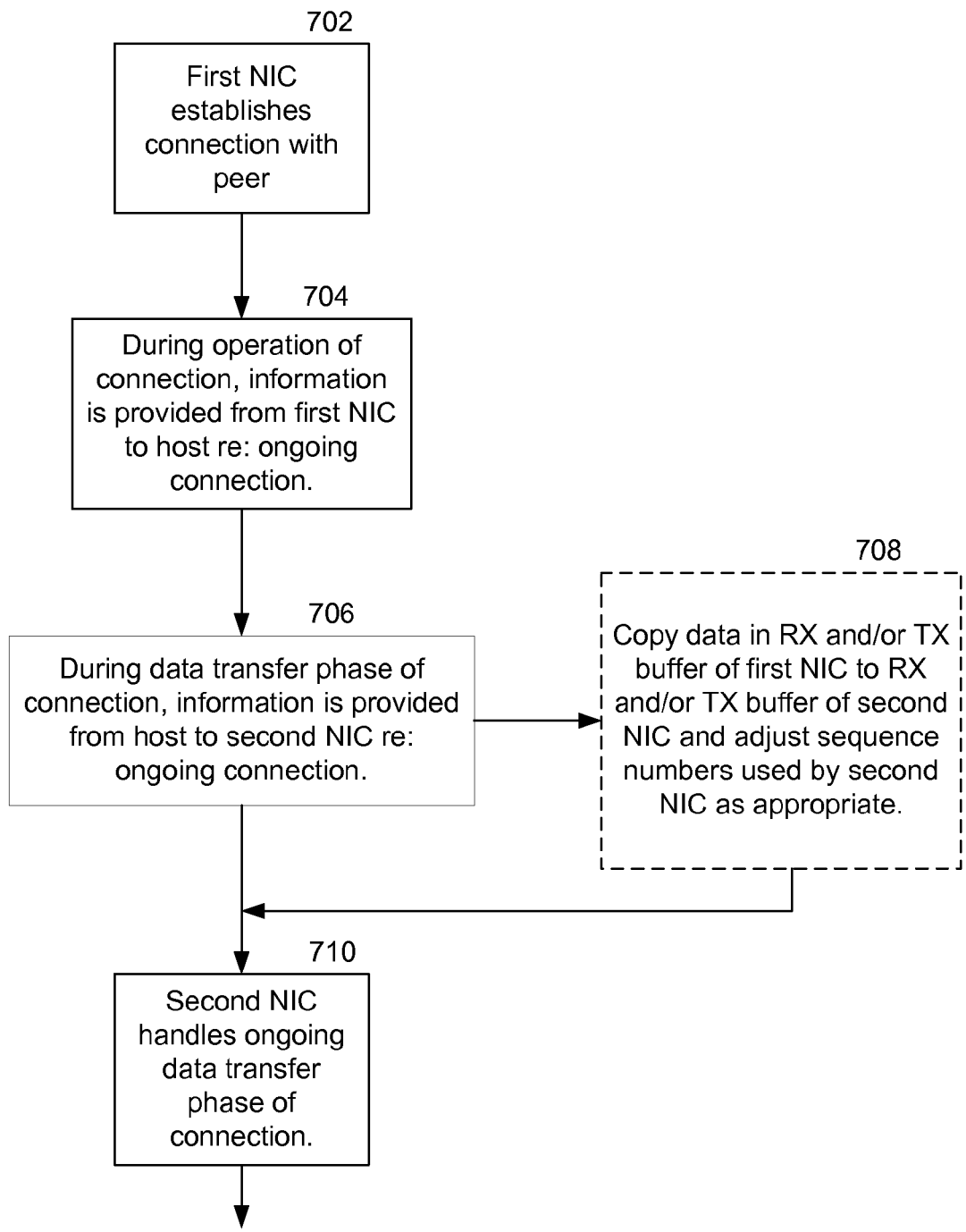
FIG. 7 is a flowchart illustrating a method by which a connection being operated by a first network interface controller may be thereafter operated by a second network interface controller.

FIG. 7 is a flowchart that very generally illustrates a method in which, with reference also to FIG. 1, the second NIC 106 may operate a connection that is first operated by the first NIC 104. Turning to FIG. 7, at step 702, the first NIC 104 interoperates with the peer 105, including establishing a connection (such as a transport layer connection, which may include a TCP connection) with the peer 105. At step 704, during operation of the connection, which may include during the establishment phase, the first NIC 104 provides information to the host 102 regarding the ongoing connection.

In some examples, when it is determined that the connection should be handled by the second NIC 106 in place of being handled by the first NIC 104, the host 102 causes the second NIC 106 to allocate and initialize a control block for the connection, consistent with at least the 4-tuple information for the connection that is held by the host 102.

At step 706, during the data transfer phase of the connection, the information regarding the connection is provided from the host 102 to the second NIC 106. For example, the information may be provided to the second NIC 106 in response to an indication of a problem with the first NIC 104 or with the manner in which the first NIC 104 is communicating (or not communicating) with the peer 105.

At step 708, if necessary, data in the receive buffer 112 and/or transmit buffer 114 are also provided to the second NIC 106. Furthermore, some of the information provided to the second NIC 106 may be adjusted based on the data being in the receive buffer 122 and/or transmit buffer 114—whether prior to or after being provided to the second NIC 106. That is, for example, buffer pointer information in the host 102 may be "stale" compared to the corresponding buffer pointer information on the first NIC 104, and the difference would be determinable based on an indication of the amount of data yet to be consumed in the receive buffer 122 and/or transmit buffer 114. In one example, the data in the receive buffer 122 and/or transmit buffer 114 may be provided to the second NIC 106 via a loopback host path from the first NIC 104 to the second NIC 106, so that the data arrives in the second NIC 106 to be processed based on the TCB for the connection in the second NIC 106.

At step 710, the second NIC 106 handles the ongoing data transfer phase of the second connection.

As mentioned above, as part of the second NIC 106 handling the connection, the second NIC 106 allocates and initializes a control block for the connection. The second NIC 106 may allocate and initialize the control block speculatively, prior to when a connection previously being handled by the first NIC 104 may be instead handled by the second NIC 106. In some examples, beyond initializing the control block on the second NIC 106, the control block on the second NIC 106 may be additionally speculatively populated, so that the second NIC 106 may be a "hot" or "warm" standby, depending on the degree to which the control block on the second NIC 106 is to be updated prior to the second NIC 106 actually operating the connection in place of the first NIC 104 operating the connection.

For example, at one extreme, the second NIC 106 may be a completely cold standby, with no action being taken on the second NIC 106 with respect to the connection until direct preparations are made for the second NIC 106 to operate the connection in place of the first NIC 104 operating the connection. At another extreme, the second NIC 106 may be prepared to be ready (or practically ready) to operate the connection with no or little additional preparation. This may be a result, for example, of the host 102 providing information regarding the connection to the second NIC 106 in response to (or soon thereafter) the information being received from the first NIC 104.

In between the two extremes, in some examples, the second NIC 106 may have some of the information regarding the connection. For example, relatively static information may be more occasionally provided to the second NIC 106 (or even from the first NIC 104 to the host 102), such as information mentioned above that is useful, but not strictly necessary, for the second NIC 106 to handle the connection in place of the first NIC 104 handling the connection—information such as retransmit counts, peer window, congestion window, timer values.

In some examples, when the connection is to be handled by the second NIC 106, the mapping of the 4-tuple of the connection to the control block for handling the connection by the second NIC 106 may be completed. For example, an entry in a CAM of the second NIC 106 may be completed with the 4-tuple for the connection, where the index (tid) represented by that entry points to the control block for the connection, on the second NIC 106.

Referring again to FIG. 6, we describe a particular example of a connection operating on NIC1 606 may thereafter be operated on NIC2 607, where either the shadow sequence variables on the host 616 for the connection are not stale or memory buffers on the NIC1 606 are accessible. In FIG. 6, the connection is initially between Host 616 and a peer 611, via the NIC1 606 and one or more switches 610. Moreover, the connection is offloaded onto NIC1 606 in the sense that host 616 endpoint protocol processing is handled by NIC1 606. The connection is referred to by its handle tid-NIC1, which is a handle that is used by the internal processing of NIC1, such as to reference the connection state in order to perform protocol processing for the connection. A precursor to operating the connection by NIC2 607 instead of by NIC1 606 may be, for example, that the peer 611 becomes unreachable from NIC1 606, e.g. due to a fault in NIC1 606 or one or more of the intermediate switches 610 between NIC1 606 and the peer 611, or for some other reason. Or a precursor may be a desire to operate the connection by NIC2 607 for some other reason.

We have thus described how, when a network interface device is operating a connection (even in a full offload manner), the host is independently maintaining information such as an "initial sequence number" for a TCP/IP connection so that the host can adequately handle application payload data that is, as a result of protocol processing by the host, provided from the NIC to the host.

We now consider the case where NIC1 606 is still reachable from the host 616 (e.g., NIC1 606 is not hung from the host side) and in this case the FIG. 7 process may proceed as follows: The host software (such as host failover software) takes over the host endpoint of the connection and "moves" it to a new host endpoint 602. The host software also "moves" the peer endpoint 611 to a local host endpoint 604. Moving the end point to new host endpoint 604 can be achieved, for example, by rewriting the NIC1 port indication for the connection in the TCB of the NIC1 606 from being 0-3, which corresponds to one of the Ethernet ports on the adapters, to be one of 4-7, which corresponds to looping the packets back to the host 616 without transmitting the Ethernet packets to the wire. More specifically, egress pipeline processing in the NIC1 606 is configured to provide the packets back to the host 616.

The transmit buffers on NIC1 606 may not be empty if all the data in the transmit buffer has not been sent or, alternately, if the data has been sent but a corresponding peer acknowledge has not been received. A control message is written to NIC1 606 to quiesce the connection, i.e. to stop transmitting to Ethernet wire and stop transmitting to the host. The receive buffers on NIC1 606 may not be empty if, for example, a threshold condition has not yet been reached with respect to the receive buffers, such as a number of bytes to be transferred to the host 616 or, in the case of iSCSI and iWARP RDMA, until receiving the remainder of a partial-received PDU. When the endpoints of the connection in the first NIC are both moved to Host 616 it is important that now further packets are not received from the peer for this connection because that might lead to data corruption. To guarantee this a drop filter is created in first NIC such that any packet with 4-tuple matching the connection and that arrives from peer 611 is dropped. See, for example, U.S. patent application Ser. No. 11/250,894 (Atty Docket No. CHELP011), filed on Oct. 13, 2005, entitled FILTERING INGRESS PACKETS IN NETWORK INTERFACE CIRCUITRY and incorporated herein by reference in its entirety.

Moving the endpoints to points 602 and 604 may include, for example, setting up DMA receive queues and work request queues to allow sending of CPL messages and Ethernet encapsulated TCP/IP packets between those endpoints 602 and 604 and the NIC1 606. A purpose of utilizing these endpoints 602 and 604 is to move buffered transmit and receive data in NIC1 606 to the NIC2 607 for continued operation of the connection, and these endpoints are also used to derive the values for snd_una and rcv_nxt by using CPL connection teardown messages. An advantage of using the CPL connection teardown messages is that this cleans up any state allocated to the connection on the first NIC so that the same procedure can be used for failover and for migration of the connection from the first NIC to the second NIC, and for use with the migration of the virtual machine where the application is migrated to run on another Host. The distinction between failover and migration as used here is that migration is not associated with a failure of the first NIC but instead an event in the virtualizing software such as re-provisioning of the NIC resources attached to a particular host. The virtualizing software can also decide to migrate the process using the connection to a different host in which case the buffer information attached to the endpoints 602 and 604 is moved with the application to the different host as part of the application migration process.

Resources for the connection to be operated in NIC2 607 are allocated. For example, resource for the connection may be allocated in NIC2 607 using 4-tuple information stored on the host and then issuing a CPL_ACT_OPEN_REQ message that is issued from host to NIC2. This message will result in returning a handle tid-NIC2 607 that is a connection index for the connection as operated in NIC2 607. In other words, while it may be considered that, to NIC2 607, the connection is a "new" connection, the connection is actually the same connection that was previously being operated by NIC1 616.

In the example, next, the receive threshold for the connection is changed in NIC1 606 to a zero-byte regular TCP stream (i.e., in the TCB associated with the tid-NIC1), so that NIC1 606 will no longer wait for the rest of a PDU or wait to reach a threshold number of bytes. As a result, the receive buffer will drain to the endpoint 602 (unless the receive buffer was already empty, in which case there is nothing to drain). At the endpoint 602, the drained data will be stored in a host receive buffer. The connection quiesce may then be cleared, which enables the NIC1 606 to forward the data in the NIC1 606 transmit buffer to the host end point 604, typically after waiting for a retransmission timeout to occur (unless the transmit buffer was already empty, in which case there is nothing to be received). The number of bytes in the endpoint 602 receive failover buffer is referred to as n-rx-tid-NIC1 and the number of bytes in the endpoint 604 transmit buffer is referred to as n-tx-tid-NIC1. An example of computation to derive snd_una and rcv_nxt is described next, and for the detailed sequencing of CPL messages and TCP packets we refer also to FIG. 8.

Figure 8:
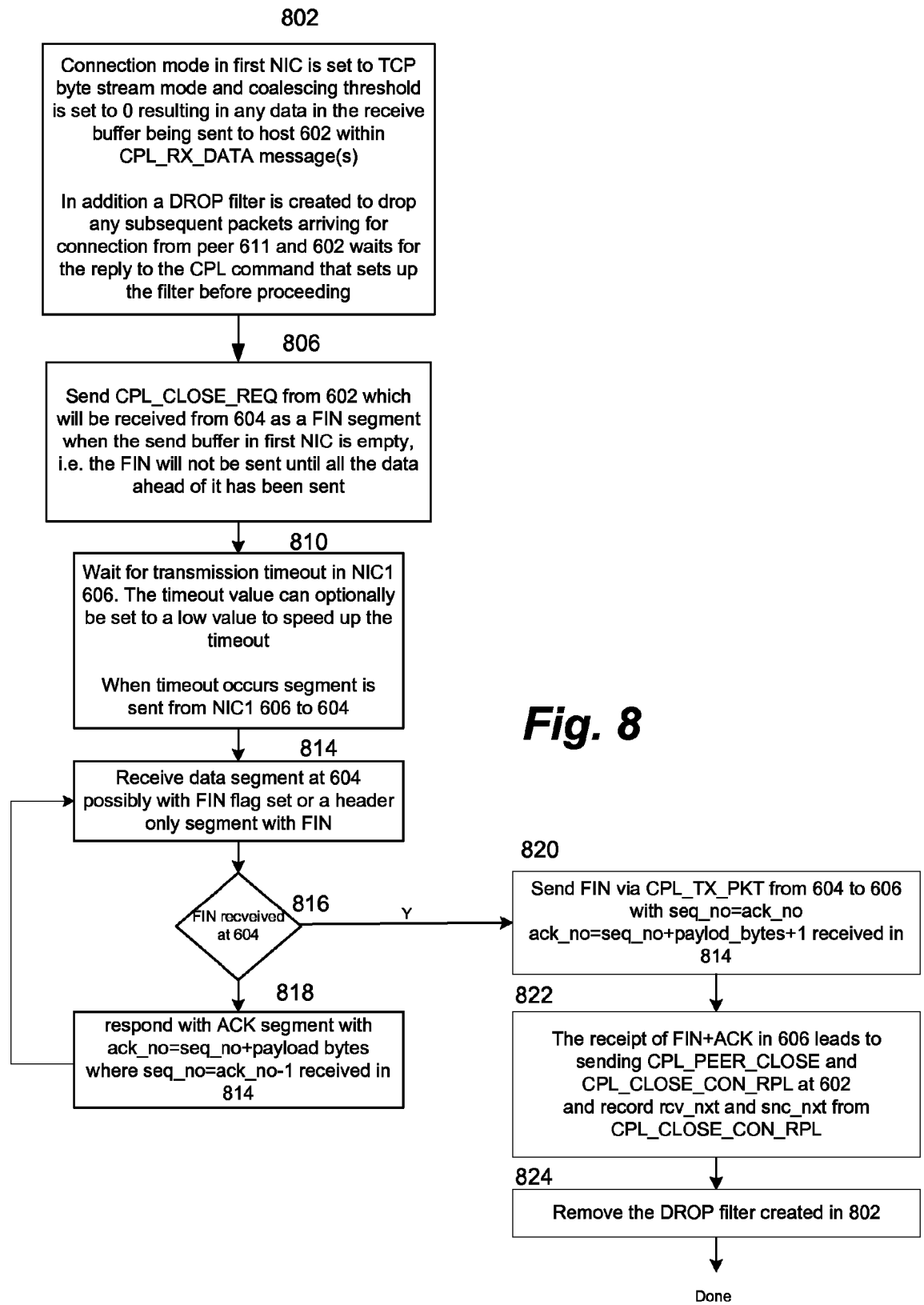
FIG. 8 is a flowchart illustrating a method by which an indication of the value of certain TCP variables is recovered via a TCP teardown operation

Step 802 of FIG. 8 is to cause the buffer data to be cleared the NIC1 606 and, as discussed above, to set up a DROP filter in NIC1 606. After the buffer data has been cleared, if necessary, from the NIC1 606, then the connection represented by the tid-NIC1 is closed (step 806, which deallocates all state information within the first NIC) by issuing a CPL_CLOSE_CON_REQ message into the end 602 of the connection. This close message will be buffered behind any data in the transmit buffer of the first NIC, and the data in the buffer and eventually a FIN will be sent after a retransmission timeout from 602 via an offloaded connection in first NIC 606 to 604, and this is shown in Steps 810, 814, 816, and 818 of FIG. 8. The loop in Steps 814, 816, 818 is required in the case where the transmit buffer in first NIC contains more data than the maximum size of a TCP segment, and in this case the 604 end of the connection needs to acknowledge each received segment, by sending an ACK segment into the 604 end of the connection. As shown in Steps 814, 816, 820 and 822 (and 824, to remove the DROP filter), in FIG. 8, when the FIN is received at the 604 end of the connection the host acknowledges the receipt with a FIN+ACK segment, to acknowledge the receipt of the FIN from 606 and to send its own FIN to close the connection from the 604 end of the connection. Finally, when 606 processes this FIN a CPL_CLOSE_CON_RPL message is returned through the end 602 that contains the state, at the close of the connection, of the sequence number corresponding to the sequence number of the last byte of sent data+1 and the next expected sequence number to be received. This information, together with n-rx-tid-NIC1 and n-tx-tid-NIC1 are used to set snd_una and rcv_nxt in tid-NIC2, i.e. snd_una=CPL_CLOSE_CON_RPL.seq_nxt−n-tx-tid-NIC1−1 and rcv_nxt=CPL_CLOSE_CON_RPL.rcv_nxt−n-rx-tid-NIC1−1. Finally, the transmit buffer data is sent to NIC2 using a CPL_TX_DATA message 612 with handle tid-NIC1, and the receive buffer data is sent to NIC2 using a CPL_TX_PKT with valid Ethernet/TCP/IP encapsulation where the TCP header sequence numbers corresponds to tid-NIC2 rcv_nxt and the acknowledge number to tid-NIC2 snd_una destined to one of the ports 4-7 such that it loops around as receive data for tid-NIC2.

We have thus described how, when a network interface device is operating a connection (even in a full offload manner), the host is independently maintaining information such as the 4-tuple information and an "initial sequence number" for a TCP/IP connection so that the host can adequately handle application payload data that is, as a result of teardown TCP protocol processing by the host, provided from the NIC to the host.

Figure 9:
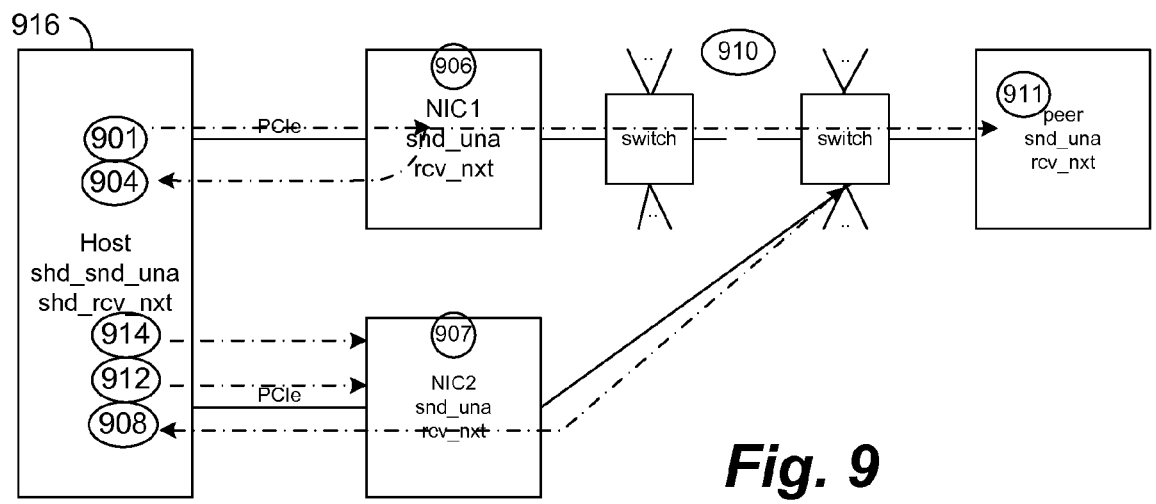
FIG. 9 is a block diagram illustrating how, in a process of switching from operating a connection on one NIC to operating the connection on another NIC, information regarding the connection may be retrieved from the first NIC.

We now describe an approach to connection migration or failover which does not involve connection teardown messages on the first NIC. Referring to FIG. 9, This method relies on the first NIC 906 being reachable from the Host 916, and instead of tearing down the connection in first NIC 906 it loops the packets of the connection back to the Host 916 and the host software switches packets between the first NIC 906 and the second NIC 907 until the state of the connection has been determined, at which point in time the connection is migrated to the second NIC 907. Referring to FIG. 9, in this approach, when a connection being operated by the first NIC 906 is to be moved to second NIC 907 the host software (such as host failover software) sets up a new connection state in second NIC 907 with the same tuple as the connection being migrated. The host software configures the newly created connection state in second NIC 907 to be in "non-offload" mode, where ingress frames which match the connection's tuple are steered to the host, preferably to a pre-determined queue 908. Packets sent by the peer 611 received through the second NIC 907 are "tunneled" to the host to 908, where they are forwarded to first NIC 906 through 901 in a CPL_TX_PKT command configured to loop the packets back internally to first NIC 906 to be processed. The loop back can be achieved for example by setting the port number in the header of the CPL_TX_PKT command to have value 4-7.

The host software also configures the connection state in the first NIC 906 such that transmitted packets are looped back to the host, preferably to a predetermined queue 904, where the host software proceeds to send them back as "tunneled" frames on the second NIC 907. This can be achieved, for example, by rewriting the NIC1 port indication for the connection in the TCB of the NIC1 906 from being 0-3, which corresponds to one of the Ethernet ports on the adapters, to be one of 4-7, which corresponds to looping the packets back to the host 916 without transmitting the Ethernet packets to the wire. More specifically, egress pipeline processing in the NIC1 906 is configured to provide the packets back to the host 916.

In effect, the host software then operates as a switch between the peer endpoint 911 and first NIC 906, allowing the first NIC 906 to drain the transmit buffer and receive buffers while observing the communication between the first NIC 906 and the peer 911, such that it gains knowledge of the current sequence numbers for the connection. In particular, by observing the acknowledgment numbers exchanged by the two endpoints in the TCP header of each packet, the rcv_nxt sequence of each end can be learned. When sufficient progress has been achieved on the connection to drain the transmit buffer, and the host software has gathered the information necessary to finalize the move of the connection to the second NIC 907, the host software can then update the sequence numbers and clear the "non-offload" flag in the connection state of the second NIC 907, at which point the second NIC 907 offloads the connections, the connection has been migrated to the second NIC 907.

It should be noted that it is also envisioned that various modifications, additions, substitutions and the like can be made. For example, various portions of the above-described methods for updating the connection variables on the host (i.e., a method using teardown messages with respect to the first NIC and a method in which teardown messages with respect to the first NIC are not used) may be mixed, with various steps being performed by the software/firmware/hardware being employed to accomplish the same or equivalent function.

We have thus described a number of example methods by which a host is independently maintaining information of a transport layer connection as the connection is being handled by a first network interface device as. Furthermore, the host may cause the transport layer connection to be thereafter handled by a second network interface device, based at least in part on the connection information being independently maintained by the host. In some cases, the method includes interoperating with the first network interface device to ensure that the independently maintained information is current or is made current such that connection may be robustly operated by the second network interface device based on this information.

What is claimed is:

1. A method for communication of a host having a first network interface device and a second network interface device coupled thereto, the method comprising:

by the first network interface device, operating a data transfer phase of a transport layer network connection between the host and a peer, including maintaining connection information to operate the data transfer phase of the transport layer connection between the host and the peer;

by the host, while the first network device is operating the data transfer phase of the transport layer network connection with the peer, including maintaining the connection information to operate the data transfer phase of the transport layer connection between the host and the peer, determining the connection information that describes the transport layer network connection being operated by the first network interface device independently of the first network interface device maintaining the connection information; and causing the second network interface device to operate the transport layer network connection with the peer based at least in part on the connection information maintained by the host, wherein the causing step does not include providing the connection information maintained by the first network interface device from the first network interface device.

2. The method of claim 1, wherein:
determining the connection information by the host independently of the first network device maintaining the connection information includes receiving information from the first network interface device while the first network device is operating the data transfer phase of the transport layer network connection and determining the connection information based at least in part on the received information.

3. The method of claim 1, wherein:
causing the second network interface device to operate the transport layer network connection based at least in part on the connection information maintained by the host further includes causing at least one of transmit buffer data and receive buffer data to be provided from the first network interface device to the second network interface device.

4. The method of claim 3, further comprising:
adjusting at least a portion of the connection information maintained by the host, based on which the second network interface device is caused to operate the data transfer phase of the transport layer connection, to account for the at least one of transmit buffer data and receive buffer data provided from the first network interface device to the second network interface device.

5. The method of claim 4, wherein:
the adjusting step is performed by the second network interface device.

6. The method of claim 5, wherein:
at least one of transmit buffer data and receive buffer data is provided from the first network interface device to the second network interface device based on configuration of the second network interface device by the host.

7. The method of claim 5, wherein:
the host configures the first network interface device such that transmit buffer data is provided by egress pipeline processing of the first network interface device without providing the packets to the transport layer network connection with the peer.

8. The method of claim 7, wherein:
the host configuring the first network interface device such that transmit buffer data is provided by egress pipeline processing of the first network interface device without providing the packets to the transport layer network connection with the peer comprises:
the host causing a peer endpoint of the connection to be moved to a local host endpoint.

9. The method of claim 8, wherein:
the host causing a peer endpoint of the connection to be moved to a local host endpoint comprises:
rewriting, in a control block in the first network interface device for the connection, a port indication for the host endpoint of the connection that corresponds to a port in the local host.

10. The method of claim 1, further comprising:
causing the connection information being maintained by the host independently of the first network device maintaining the connection information, that describes the transport layer network connection being operated by the first network interface device, to be provided to the second network interface device.

11. The method of claim 10, wherein:
causing the connection information being maintained by the host to be provided to the second network interface device is at least in part while the first network interface is operating the connection.

12. The method of claim 1, wherein:
the connection information being maintained by the host independently of the first network device maintaining the connection information includes at least one connection state variable that is an assumed value of the connection state variable associated with a current state of the connection, wherein the assumed value is not guaranteed to equal an actual value of the connection state variable, as maintained by the first network interface device.

13. The method of claim 12, wherein:
the host maintains the at least one connection state variable independently of the first network device maintaining the at least one connection state variable using at least information provided from the first network interface device; and
the information provided from the first network interface device used by the host to maintain the at least one connection state variable independently of the first network device maintaining the at least one connection state variable is not synchronized to the state of the connection maintained by the first interface device.

14. The method of claim 1, wherein causing the second network interface device to operate the transport layer network connection with the peer based at least in part on the connection information maintained by the host includes:
initializing the second network interface device to handle the connection;
causing at least one of receive data and transmit data of the connection to be provided back to the host from the first network interface device;
by the host, providing the at least one of receive data and transmit data of the connection, received from the first network interface device, to the second network interface device; and
configuring the second network interface device to operate the connection including using the data of the connection provided by the host to the second network interface device.

15. The method of claim 14, wherein:
as the at least one of receive data and transmit data of the connection to be provided back to the host from the first network interface device, the host updates the information for the connection independently of the first network device maintaining the connection information; and
configuring the second network interface device to operate the connection includes providing the updated information for the connection from the host to the second network interface device.

16. A computer program product comprising at least one non-transitory tangible computer readable medium having computer program instructions tangibly embodied therein, the computer program instructions configured to cause a host computing device, having a first network interface device and a second network interface device coupled thereto, to:

cause the first network interface device to operate a transport layer network connection between the host and a peer, including maintaining connection information to operate the data transfer phase of the transport layer connection between the host and the peer;

while the first network device is operating the data transfer phase of the transport layer network connection with the peer, including maintaining the connection information to operate the data transfer phase of the transport layer connection between the host and the peer, determine the connection information that describes the transport layer network connection being operated by the first network interface device independently of the first network device maintaining the connection information; and cause the second network interface device to operate the transport layer network connection with the peer based at least in part on the connection information maintained by the host, wherein the causing the second network interface device to operate the transport layer connection does not include providing the connection information maintained by the first network interface device from the first network interface device.

17. A host computing device, having a first network interface device and a second network interface device coupled thereto, the host computing device configured to:

cause the first network interface device to operate a transport layer network connection between the host and a peer, including maintaining connection information to operate the data transfer phase of the transport layer connection between the host and the peer;

while the first network device is operating the data transfer phase of the transport layer network connection with the peer, including maintaining the connection information to operate the data transfer phase of the transport layer connection between the host and the peer, determine the connection information that describes the transport layer network connection being operated by the first network interface device independently of the first network device maintaining the connection information; and cause the second network interface device to operate the transport layer network connection with the peer based at least in part on the connection information maintained by the host, wherein the causing the second network interface device to operate the transport layer connection does not include providing the connection information maintained by the first network interface device from the first network interface device.

\* \* \* \* \*